UNITED STATES PATENT OFFICE.

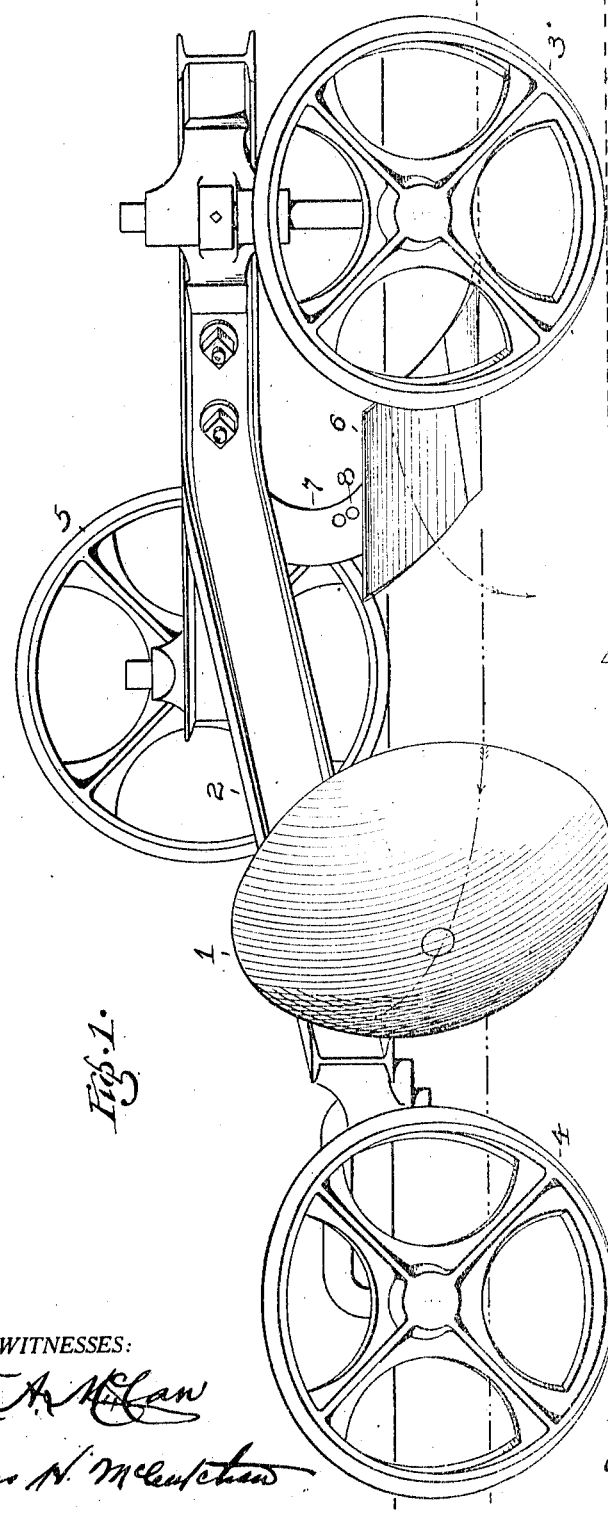

GEORGE SPALDING, OF STOCKTON, CALIFORNIA, ASSIGNOR TO SPALDING PLOW COMPANY, OF PITTSBURG, PENNSYLVANIA, A CORPORATION OF PENNSYLVANIA.

PLOW.

988,739.         Specification of Letters Patent.    Patented Apr. 4, 1911.

Application filed February 23, 1907. Serial No. 358,912.

*To all whom it may concern:*

Be it known that I, GEORGE SPALDING, a citizen of the United States, and residing at 39 South California street, in the city of Stockton, county of San Joaquin, and State of California, have invented certain new and useful Improvements in Plows; and I do hereby declare the following to be a full, clear, and exact description of the said invention, such as will enable others skilled in the art to which it most nearly appertains to make, use, and practice the same.

This invention relates to an improvement in plows, in which a moldboard plow and a rotary disk are combined to plow a deep furrow.

A moldboard plow which is wedge-shaped, enters and pries up a quantity of soil and turns it upside down. There is a limit to the depth and width to which such a plow can cut and properly handle the ruptured soil. The prime disadvantage, is the inability of the moldboard to pulverize and elevate the severed soil to a sufficient height to turn it upside down on top of a deep furrow. These disadvantages are in a measure obviated by the use of a rotary, concave disk, the use of which is confined to ground that will pulverize.

In rotary disk plows the practical working diameter of disks is approximately twenty-four inches. About one-third of the diameter of the disk is capable of cutting and turning a furrow economically. The forward edge of the disk from the ground to the vertical center of the disk below ground is the cutting edge, which shares off the soil and passes it onto the remaining surface of the submerged disk, up which it carried by the rotation until the curvature of the disk turns it completely over, and spills it into the open furrow of the former cut. The furrow depth to which a twenty-four inch disk can cut is about eight inches. This depth suffices in all ordinary cases. In sugar beet culture for instance, it is necessary to plow to a depth of from twelve to sixteen inches, this would require a disk forty-eight inches in diameter, with a proportionate convexity, which from a structural and operative standpoint is impractical. A moldboard plow, to accomplish this result, has baffled the plow art. Practical demonstration proves that a twenty-four inch disk will elevate the soil to a height of thirty-six inches from its lower edge, at normal speed; provided that the disk is not cutting off more than a normal quantity. The rotation of the disk carries the soil up, the concavity turns it, and the centrifugal force pulverizes and distributes it. Comparing the two implements we find that the moldboard has the necessary penetration and suction; but lacks the requisite elevating qualities. The disk has the elevating qualities but lacks the depth qualification.

The object of this invention is to combine these devices in a single implement to plow a single compound furrow.

In the accomplishment of the above object the invention broadly consists of two plows to cut one furrow, one plow being set forward and above the other, and laterally offset therefrom. Common to all wheel plows this construction requires a suitable frame mounted upon wheels set to counteract the thrust of the plows. This structure being old no claim of novelty is made therefor.

Attention is directed to my existing Patents #793204, dated June 27th, 1905, and #801410 dated Oct. 10th, 1905, in this class.

In the drawings: Figure 1 is a side elevation at right angles to the line of draft of a plow constructed in accordance with this invention. Fig. 2 is a diagrammatic rear elevation looking in the direct line of draft of two plows set in the ground in the preferred relation to each other. Fig. 3 is a plan from above of the same.

Because of the peculiar angles, curvatures, &c., in the relation of the parts of the plow, the line of draft becomes the most feasible base from which to calculate. The line of draft is a line through the balance center of the lateral resistance parallel with the forward direction of the plow movement.

In detail the construction consists of the disk #1 suitably journaled in the I-beam #2 which is the backbone of the plow, the forward and rear furrow wheels #3 and #4 being attached thereto. One or both of these wheels may be pivoted to facilitate turning corners or may be provided with a tiller to aid in steering the plow. The disk #1 determines the depth of the furrow. This may be regulated by raising or lowering the furrow wheel #3 and the land wheel #5. The moldboard plow #6 is adjustably mounted on the beam #7 bolted to the backbone of the frame. This beam #7 is provided with a series of holes #8 which provides for the vertical adjustment of this plow. The disk bracket is similarly attached to the beam #2. By this construction the vertical distance between the two plows may be varied to increase or diminish the depth of cut of either or both of them.

The scale carried out in the drawing is one-eighth full size. The plow is turning a furrow fourteen inches deep and a proportionate width. The leading plow #5 opens the furrow to a depth of six inches, and the following disk #1 set eight inches lower, completes the total depth of fourteen inches. While the disk 1 is completing the furrow, the plow 5 is making the initial cut of the next furrow. Assuming that the first furrow has been completed and the second furrow is being plowed, the leading plow turns the earth of the initial furrow into the previously completed initial furrow, and the disk following, overturns this slice and cuts the subsoil, turning the whole over into the first complete furrow and in this manner completing the second furrow. The actual work of this leading plow is merely to sever the soil which falls by gravitation from the moldboard into the open furrow beneath it. It is obvious that this forward plow is relieved of the duty of elevating the earth severed, accomplishing a very great saving in draft as the shape of the severed furrow is such that the soil is tilted into the open furrow without having to travel across the cylindrical face of an extended moldboard as is the case of a moldboard which has to sever, elevate and turn the ground upside down. The furrow from the leading plow is delivered in the path of the following disk which in effect acts as the moldboard for both, with the result that the soil from the bottom of the furrow is raised fourteen inches and forms the top of the soil spilled into the furrow of the former cut. The advantages of this deep cut are obvious. The ground is pulverized for a depth of fourteen or more inches; the worn-out surface is buried a like depth; and a new surface is thrown up to the action of the air and the sun.

To throw the second plow into position to begin cutting where the former stopped, it is offset to the right. This statement will be elucidated by reference to the double scallop forming the landside of the furrow (see Fig. 2).

The shape of the plow share and the contour of the moldboard are chosen with respect to the nature of the soil to be tilled. The disks are set at an angle to the line of draft and tilted back vertically; this arrangement will vary with the size and curvature of the disks.

Demonstration in the field has proven that there is no limit to the depth to which the soil can be tilled by this progressive action in cutting the furrows. By using mechanical traction, as a locomotive force, speeds can be attained which will cause a rotating disk twenty-four inches in diameter and a proper curvature to elevate the soil from any depth within the limits of consistent cultivation. As yet no demand has been raised exceeding eighteen inches; but a considerably greater depth can be attained by the use of two moldboards and a disk; one moldboard and two disks or three disks or more set in the relative positions comprehended by this invention.

Having thus described this invention, what is claimed, and desired to secure by Letters Patent is,—

1. A tilling machine comprising a mold board plow and a rotary disk, said moldboard plow being set in advance of said disk and on a different horizontal plane and a different vertical plane, said disk being constructed to deepen the furrow opened by said mold board.

2. A tilling machine comprising a mold board plow and a rotary disk, said mold board plow being set in advance of said disk and on a different horizontal plane and also in a different vertical plane, said disk being constructed to deepen the furrow opened by said mold board, and means for adjusting the relative positions of said mold board and disk.

In testimony whereof, I have hereunto set my hand this 15th. day of February 1907.

GEORGE SPALDING.

Witnesses:
 BALDWIN VALE,
 F. A. McCAN.